2,796,693
FISH LURE

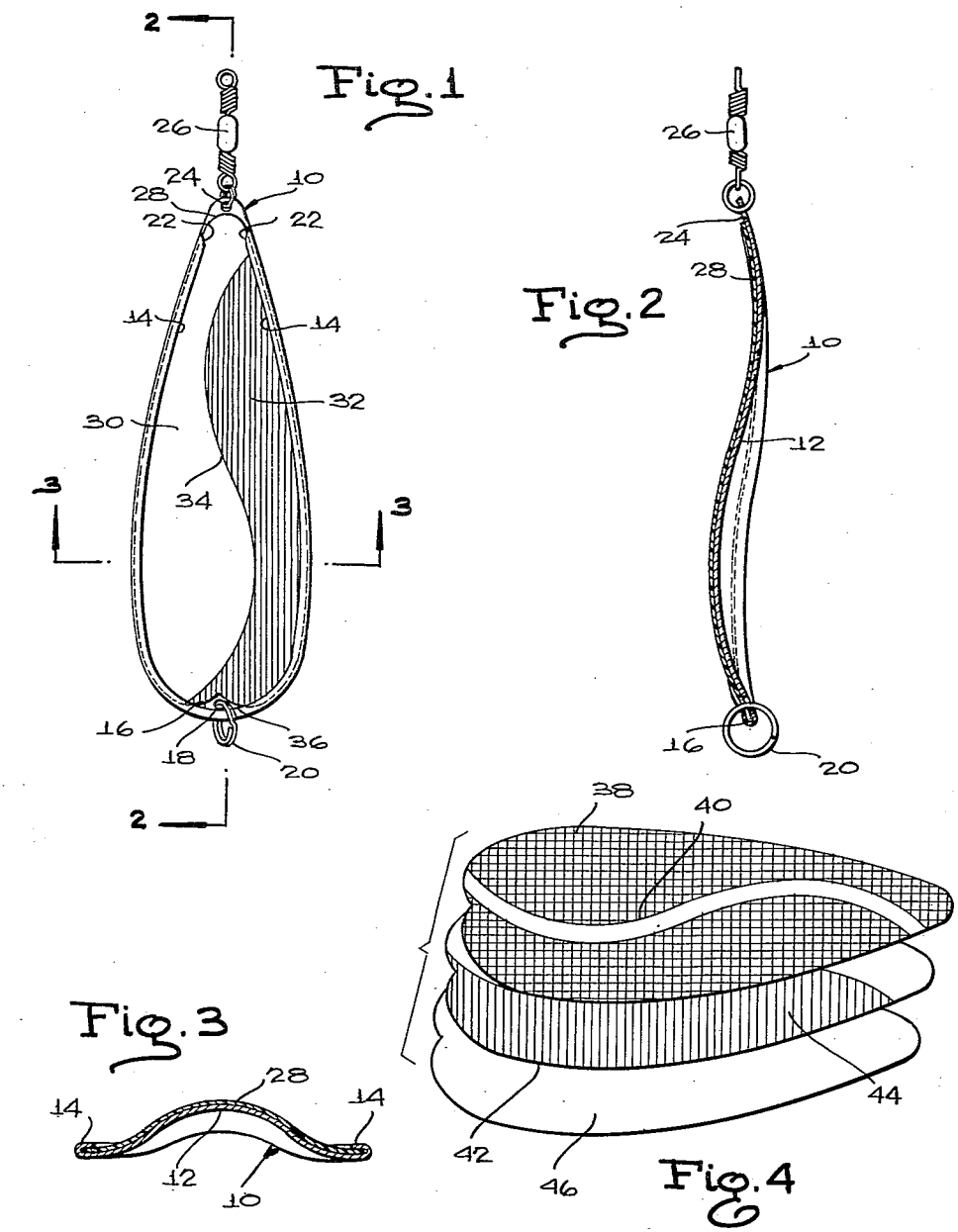
June 25, 1957  C. W. GUNTERMAN  2,796,693
FISH LURE
Filed Feb. 8, 1955
INVENTOR.
CHARLES W. GUNTERMAN
BY
ATTORNEYS

Charles W. Gunterman, Midland, Mich.

Application February 8, 1955, Serial No. 486,780

1 Claim. (Cl. 43—42.09)

This invention is a fish lure of the spoon type, having interchangeable inserts detachably connectable to a body portion having means at its opposite ends for connection of a fishing line and hook respectively.

It is not broadly new to provide interchangeable inserts for a spoon type lure, but the main object of the present invention is to provide improved means for connecting the selected insert to the body portion, which means coacts with the particular longitudinal and cross sectional shape of the body portion and insert to facilitate attachment or removal of the insert as well as a secure interengagement of the body portion and insert while the lure is in use.

Other objects will appear from the following description, the claim appended thereto, and from the annexed drawing, in which like reference characters designate like parts throughout the several views, and wherein:

Figure 1 is a front elevational view of a lure formed in accordance with the present invention;

Figure 2 is a longitudinal sectional view on line 2—2 of Figure 1;

Figure 3 is a transverse sectional view on line 3—3 of Figure 1; and

Figure 4 is a detail perspective view showing a plurality of the inserts per se.

The lure 10 includes a body portion 12 formed of a thin, non-resilient metal one face at least of which is highly polished to provide a reflective surface. When seen in longitudinal section along a line extending longitudinally and centrally thereof, as for example the section line 2—2, the body portion (see Figure 2) has a compound curvature, the curving of the body portion being effected along gradual lines, with the leading end portion thereof being curved reversely to the trailing end portion.

Integrally formed upon the body portion is a peripheral, narrow flange 14 of constant width over its entire length, extending for substantially the full length of the side edges of the body portion, and provided with a bight portion 16 at the larger, trailing end of the body portion. The marginal flange 14, 16 is turned inwardly, in closely spaced relation to that face of the body portion which is to receive the selected, interchangeable insert. The body portion, as shown in Figure 1, is pear shaped in outer configuration, and medially between its opposite sides, at its trailing end, has a small opening 18 receiving a ring 20 to which a hook, not shown, is connected, said opening 18 being spaced closely from the bight part 16 of the flange 14.

The flange 14, as shown in Figure 1, terminates adjacent the smaller end of the body portion, the extremities of the flange being beveled as at 22 obliquely to the side edges of the body portion. Forwardly of the extremities of the flange, the body portion has a small aperture 24 receiving one end of a connecting swivel to the other end of which is connectable a fishing line or leader, not shown.

Considering now the cross sectional shape of the body portion, this, as shown in Figure 3, has relatively flattened side areas and a transversely bowed midwidth area.

One of the interchangeable inserts usable with the body portion is designated at 28. The insert is made of a thin, resiliently flexible plastic, suitably colored to adapt the same to the particular type of fishing in which the lure is being used. Thus, the insert 28 has a white side portion 30, and an opposite, red side portion 32, said side portion being divided by a compoundly curved line 34 extending substantially from end to end of the insert between the opposite sides thereof. The coloring of the insert, it should be noted, extends through the full thickness of the insert, so that the colors will not fade, wash off, or be otherwise subject to deterioration during use of the lure, and will always remain wholly brilliant and clear.

The insert has an outer configuration substantially duplicating that of the body portion, the insert being, however slightly smaller than the body portion in both width and length, so as to permit the same to be peripherally engaged by the flange 14.

At its larger, trailing end, the insert has a shallow notch 36 providing a clearance space for the ring 20, and exposing the aperture 18 for extension of the ring therethrough. The leading end terminates short of the aperture 24, for a similar purpose.

In inserting the insert or backing plate 28 one slides the smaller end of the same longitudinally of the body poriton, engaging the opposite sides of the backing plate in the peripheral groove defined by the inturned flange 14. The flange 14 thus provides a trackway, along which the backing plate slides. The backing plate may be slightly flexed in a transverse direction during the insertion, to facilitate its engagement in the respective sides of the flange 14. When the insert has been shifted longitudinally of the body portion to the maximum extent, it is resiliently flexed to engage the larger end thereof in the bight part 16 of the attaching flange. As a result, the lure can be used with one side highly polished and the other side suitably colored through the provision of the removable backing plate.

To remove the backing plate for insertion of a different one, one grasps the exposed small end of the backing plate at a location between the beveled extremities of the flange 14, and pulls straight outwardly. This resiliently flexes the backing plate to disengage the same from the flange 14, and in this connection, the oppositely beveled end edges of the flange provide cam surfaces facilitating the removal operation, which cam surfaces engage the opposite side edges of the backing plate adjacent the smaller extremity thereof to cause the transverse flexing of the backing plate during the removal thereof from the body portion.

A number of different inserts would be used with a single body portion, thus reducing expense considerably while still providing a highly versatile lure that can be used in various types of fishing operations for attracting different game fish. Thus, in Figure 4, there is shown a second insert 38 which is black over its entire area, except for the provision of an undulating white line 40 extending substantially longitudinally and centrally of the backing plate. A third insert designated 42 has a white portion divided by an undulating line from a blue portion 44, and a fourth insert may be wholly white as shown at 46.

The colors, of course, can be varied as desired, but in every instance, the colors should extend completely through the thickness of the insert or backing plate, to prevent fading and other deteriorating effects, and further, to permit the insert to be reversed side for side if desired for the purpose of prolonging the life thereof.

When the backing plate is attached to the body portion, it resiliently flexes into a longitudinal and cross sectional shape matching that of the body portion, as as to be in contact with the body portion over its entire area. This will be readily apparent from Figures 2 and 3.

It is believed apparent that the invention is not ncessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A fish lure comprising a pear-shaped, plate-like body portion undulant both in a longitudinal and transverse direction said body portion being compoundly curved both in longitudinal and transverse directions, the body portion including a leading end portion curved longitudinally from the leading extremity of the body portion to a location substantially at the midlength point of the body portion, said body portion further including a trailing end portion gradually curved reversely to the leading end portion, from the midlength point of the body portion to the trailing extremity thereof, the body portion having a transversely bowed midwidth area merging at its sides into transversely, oppositely curved side portions having a shallow curvature such that the side portions are relatively flattened in relation to the midwidth area of the body portion, the end portions, when viewed in section along the longitudinal median of the body portion, being symmetrically disposed in respect to a straight line drawn between the opposite extremities of the body portion; a marginal, inwardly extending flange formed on said body portion over substantialy its full periphery; and a removable insert proportioned to overlie substantially the full area of the body portion and resiliently flexible in both a longitudinal and transverse direction, said insert having its marginal part removably engaged under said flange over substantially the full periphery of the insert so as to be held against longitudinal and transverse movement in respect to the body portion, and being flexed to the transverse and longitudinal configuration of the body portion in face to face contact with the body portion, said insert having a leading end spaced inwardly from the forward extremity of the body portion for attachment of a line to the body portion forwardly of the insert, the insert having a notch at its rear end to permit connection of a hook to the body portion.

References Cited in the file of this patent

UNITED STATES PATENTS

| | | |
|---|---|---|
| 1,133,780 | Ames | Mar. 30, 1915 |
| 1,444,338 | Doering | Feb. 6, 1923 |
| 2,003,976 | Raymond | June 4, 1935 |
| 2,043,001 | Lambrecht | June 2, 1936 |
| 2,473,775 | Allen et al. | June 21, 1949 |
| 2,608,687 | Ellis | Sept. 2, 1952 |